(12) United States Patent
Matsuzaki et al.

(10) Patent No.: US 7,816,874 B2
(45) Date of Patent: Oct. 19, 2010

(54) VEHICLE DRIVING SYSTEM

(75) Inventors: Norikazu Matsuzaki, Mito (JP); Masaru Ito, Hitachinaka (JP); Shin Fujiwara, Naka (JP); Yuuichirou Takamune, Naka (JP); Kohei Itoh, Hitachiohta (JP)

(73) Assignee: Hitachi, Ltd., Tokyo (JP)

( * ) Notice: Subject to any disclaimer, the term of this patent is extended or adjusted under 35 U.S.C. 154(b) by 357 days.

(21) Appl. No.: 12/019,129

(22) Filed: Jan. 24, 2008

(65) Prior Publication Data

US 2008/0211433 A1 Sep. 4, 2008

(30) Foreign Application Priority Data

Jan. 31, 2007 (JP) ............................ 2007-020438

(51) Int. Cl.
*H02P 11/00* (2006.01)
(52) U.S. Cl. .................. 318/139; 318/440; 318/149; 701/53; 701/54; 180/170; 180/248; 180/233; 361/51; 123/319
(58) Field of Classification Search .................. 318/139, 318/440, 149; 701/54, 53; 180/170, 248, 180/233; 361/51; 123/319
See application file for complete search history.

(56) References Cited

U.S. PATENT DOCUMENTS

| | | | |
|---|---|---|---|
| 5,659,472 A * | 8/1997 | Nishino et al. ................ | 701/41 |
| 6,434,469 B1 * | 8/2002 | Shimizu et al. ............... | 701/84 |
| 7,004,018 B2 * | 2/2006 | Kadota et al. ............. | 73/115.02 |
| 7,072,756 B2 * | 7/2006 | Matsuda ...................... | 701/90 |
| 7,182,168 B2 * | 2/2007 | Kamata et al. .............. | 180/242 |
| 7,204,332 B2 * | 4/2007 | Matsuda ..................... | 180/197 |
| 7,279,855 B2 * | 10/2007 | Tahara et al. .................. | 318/46 |
| 7,529,608 B2 * | 5/2009 | Shimizu ...................... | 701/70 |
| 2007/0298928 A1 * | 12/2007 | Yamanaka et al. ............ | 477/15 |

FOREIGN PATENT DOCUMENTS

| | | |
|---|---|---|
| JP | 2001-028802 A | 1/2001 |
| JP | 2001-278083 A | 10/2001 |
| JP | 2002-127922 A | 5/2002 |
| JP | 2004-198285 A | 7/2004 |
| JP | 2004-304971 A | 10/2004 |
| JP | 2005-253196 A | 9/2005 |
| JP | 2006-87185 A | 3/2006 |

OTHER PUBLICATIONS

Japanese Office Action dated Apr. 7, 2009 (Three (3) pages).

* cited by examiner

*Primary Examiner*—Rita Leykin
(74) *Attorney, Agent, or Firm*—Crowell & Moring LLP

(57) ABSTRACT

In a four-wheel drive vehicle, front wheels 14L and 14R are driven by an engine 1, and rear wheels 15L and 15R are driven by an electric motor 5. A high-power alternator 2 is driven by the engine 1, and electric power generated from the alternator 2 drives the motor 5. In addition to controlling the power generation of the high-power alternator 2 and the driving of the motor 5, a 4WD CU 100 estimates an induced voltage E of the motor 5 from a voltage MHV of the motor and from an output current Ia of the high-power alternator, and estimates a rotating speed Nm of the motor from estimation results on the induced voltage E.

9 Claims, 8 Drawing Sheets

FIG. 9

| DC MOTOR TARGET FIELD CURRENT If (A) | 3 | 3.8 | 4.6 | 5.4 | 6.2 | 7 | 7.8 | 8.5 | 9.4 | 10.2 | 11 | 11.8 | 12.6 | 13.4 | 14.2 | 15 |
|---|---|---|---|---|---|---|---|---|---|---|---|---|---|---|---|---|
| DC MOTOR INDUCED VOLTAGE CONSTANTS TABLE Ek (V/rpm) | 0.0038 | 0.0044 | 0.005 | 0.0055 | 0.0058 | 0.0061 | 0.0063 | 0.0065 | 0.0066 | 0.0067 | 0.0068 | 0.0069 | 0.0068 | 0.0068 | 0.0068 | 0.0068 |

VEHICLE DRIVING SYSTEM

BACKGROUND OF THE INVENTION

1. Field of the Invention

The present invention relates to a vehicle driving system with an electric motor, and typically to a technique for improving controllability of an electric motor.

2. Description of the Related Art

Known techniques relating to a vehicle driving system with an electric motor include those relating to a vehicle driving system mounted in a four-wheel drive vehicle which uses an engine to drive one of two pairs of wheels (i.e., either front or rear wheels) and uses an electric motor to drive the other pair of wheels. These conventional techniques typically employ a speed sensor to detect a rotating speed of the electric motor (refer to JP-A-2005-253196 and JP-A-2006-87185). In addition, a common way of detecting this rotating speed using a speed sensor is by calculating a pulse period from detected edges of pulses and deriving the rotating speed.

SUMMARY OF THE INVENTION

During pulse detection with the speed sensor, however, when a very low speed is detected, the pulse period tends to elongate. To improve detection accuracy of the rotating speed during pulse detection with the speed sensor, therefore, there is a need to break through such a problem. In addition, in conventional systems for driving a vehicle, since the speed sensor for detecting the rotating speed of the electric motor is provided in the electric motor or in a reduction gear adapted to reduce an output level of the electric motor, the speed sensor is easily influenced by factors such as motor noise, load noise, or a backlash of the reduction gear. Accordingly, to detect the rotating speed using the speed sensor provided in the vehicle driving system, the above influence needs suppressing for improved detection accuracy of the rotating speed.

It is very important to improve detection accuracy of the rotating speed by suppressing the foregoing influence, since the improvement leads to further improving the electric motor in controllability and hence to further improving the vehicle in traveling performance. For these reasons, supplying a vehicle driving system is desired that can improve detection accuracy of the rotating speed by suppressing the foregoing influence to improve the controllability of the electric motor. Additionally, it is preferable that the vehicle driving system be suppliable without costing more than an existing system.

One of typical aspects of the present invention provides a vehicle driving system that can improve detection accuracy of a rotating speed of an electric motor by suppressing an influence on a speed sensor and can thus improve controllability of the electric motor.

The vehicle driving system according to the above typical aspect of the present invention is characterized in that the system includes, as rotating speed information output means for outputting information on the rotating speed of the electric motor, a rotating speed estimation means that estimates the rotating speed of the electric motor from an induced voltage thereof, and in that the system performs driving control of the electric motor, based on input information including the rotating speed estimated by the rotating speed estimation means.

According to the above typical aspect of the present invention, since the system has rotating speed estimation means as a substitute for a speed sensor and since the system performs driving control of the electric motor, based on the input information including the rotating speed estimated by the rotating speed estimation means, the system can improve detection accuracy of the rotating speed of the electric motor by suppressing an influence on a speed sensor, and can thus improve controllability of the electric motor.

Features of an embodiment of the present invention are listed below.

(1) One aspect of the present invention includes: an electric motor driven by a vehicle-mounted power supply and using a reduction gear to supply driving force to wheels different from wheels driven by an engine; a control means that controls the driving of the electric motor by controlling electric power to be supplied from the vehicle-mounted power supply to the electric motor; and means for outputting information on a rotating speed of the electric motor.

The rotating speed information output means in the above aspect of the invention is also rotating speed estimation means that estimates the rotating speed of the electric motor from an induced voltage thereof, and in accordance with input information including the rotating speed estimated by the rotating speed estimation means, the control means controls the electric power to be supplied from the vehicle-mounted power supply to the electric motor.

(2) In above item (1), the system is preferably constructed to include a field coil in the electric motor and so that the rotating speed estimation means estimates a first motor-induced voltage constant Ek from a field current flowing through the field coil and estimates the rotating speed of the electric motor by using the estimated first motor-induced voltage constant Ek.

(3) In above item (2), the system is preferably constructed so that driving force that has been output from the electric motor is transmitted to the wheels via a clutch, and so that if an output shaft speed of the clutch and the rotating speed of the electric motor match, the rotating speed estimation means estimates a second motor-induced voltage constant Ekpr from the output shaft speed of the clutch and the first motor-induced voltage constant Ek, and feeds back a difference between the first motor-induced voltage constant Ek and the second motor-induced voltage constant Ekpr into the first motor-induced voltage constant Ek.

(4) In above item (3), the system is preferably constructed so that when the rotating speed estimation means feeds back a comparison result on the first motor-induced voltage constant Ek and the second motor-induced voltage constant Ekpr into the first motor-induced voltage constant Ek, if a value of the second motor-induced voltage constant Ekpr is outside a previously set range, the rotating speed estimation means prohibits the feedback and judges that the system is abnormal.

(5) In above item (3), if a value of the first fed back motor-induced voltage constant Ek is outside a previously set range, the rotating speed estimation means preferably judges that the system is abnormal.

(6) In above item (3), if the value of the first fed back motor-induced voltage constant Ek is outside the previously set range, the rotating speed estimation means preferably judges that the motor is in a deterioration state.

(7) In above item (1), the system preferably includes the rotating speed estimation means in a plurality of positions, each of the rotating speed estimation means estimating the rotating speed.

(8) In above item (7), the system is preferably constructed so that:

if the rotating speed of the electric motor that has been estimated by a first rotating speed estimation means which is one of the plural rotating speed estimation means exceeds a first required value, the driving of the wheels by the electric motor is stopped; and if the rotating speed of the electric motor that has been estimated by a second rotating speed estimation means which is one of the remaining plural rotating speed estimation means exceeds a second required value greater than the first required value, the driving of the wheels by the electric motor is stopped.

(9) In above item (8), of all information on a field current of the electric motor, on a state of a selector for selecting wheel driving with the engine alone or wheel driving with both the engine and the electric motor, and on a power voltage, at least one kind of information is concurrently input to the first and second rotating speed estimation means.

(10) Another aspect of the present invention includes: an electric motor using a reduction gear to supply driving force to wheels different from wheels driven by an engine; an alternator driven by the engine in order to generate electric power necessary to drive the electric motor; control means that controls the driving of the electric motor by controlling the electric power to be supplied from the alternator to the electric motor; and means for outputting information on a rotating speed of the electric motor.

The rotating speed information output means in the above aspect of the invention is also a rotating speed estimation means that estimates the rotating speed of the electric motor from an induced voltage thereof, and in accordance with input information including the rotating speed estimated by the rotating speed estimation means, the control means controls the electric power to be supplied from the alternator to the electric motor.

According to one typical aspect of the present invention, traveling performance of a vehicle can be improved since it is possible to improve detection accuracy of a rotating speed of an electric motor by suppressing an influence on a speed sensor, and thus to improve controllability of the electric motor. Improving detection accuracy of the rotating speed makes it possible, for example, to prevent erroneous detection of slipping, to improve convergence of slipping, and hence to prevent motor torque hunting. These enhance traveling stability and roadability of the vehicle, consequently improving the traveling performance thereof.

In addition, according to one typical aspect of the present invention, it is possible to prevent the vehicle driving system from costing more than an existing system. Rather, a less expensive vehicle driving system can be supplied since the system uses rotating speed estimation means instead of a speed sensor.

BRIEF DESCRIPTION OF THE DRAWINGS

FIG. 9 is an explanatory diagram of a DC motor induced-voltage constants calculation table used for the DC rotating speed estimator in the four-wheel driving system of the present embodiment.

DETAILED DESCRIPTION OF THE PREFERRED EMBODIMENTS

A structural and operational description of a four-wheel driving system according to an embodiment of the present invention is given below with reference to FIGS. 1 to 9.

First, a total configuration of a four-wheel drive vehicle using the four-wheel driving system of the present embodiment is described with reference to FIG. 1.

Figure 1:
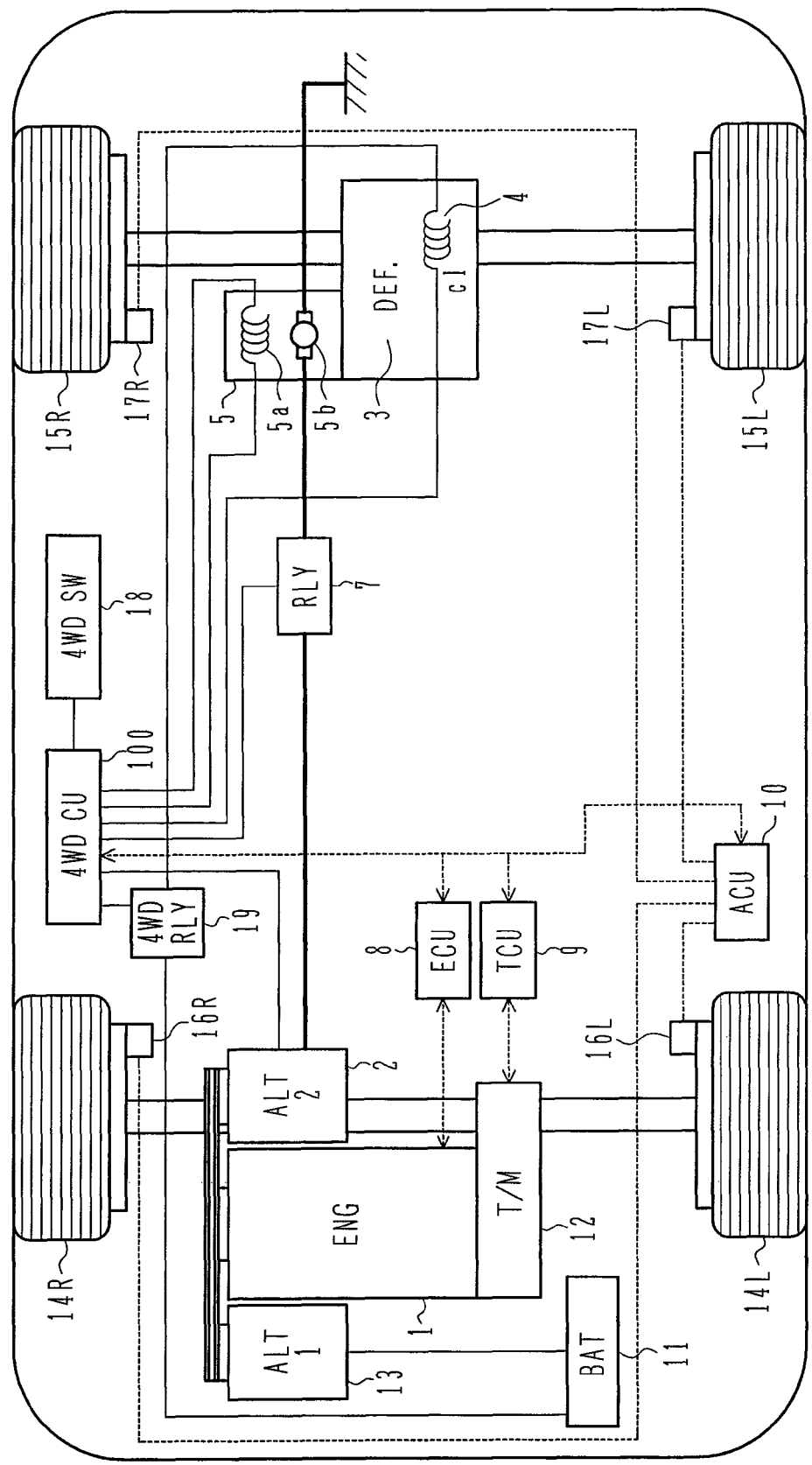
FIG. 1 is a system block diagram showing a total configuration of a four-wheel drive vehicle which uses a vehicle driving system according to an embodiment of the present invention.

FIG. 1 is a system block diagram showing the total configuration of the four-wheel drive vehicle which uses the four-wheel driving system of the present embodiment.

The four-wheel drive vehicle has an engine 1 and a direct-current (DC) electric motor 5. Driving force of the engine 1 is transmitted to left and right front wheels 14L and 14R via a transmission 12 and a first axle, thus driving the front wheels 14L, 14R.

Driving force of the DC motor 5 is transmitted to left and right rear wheels 15L and 15R via a clutch 4, a differential gear 3, and a second axle, thus driving the rear wheels 15L, 15R. When the clutch 4 becomes engaged with the differential gear 3, rotational force of the motor 5 is transmitted to a rear wheel shaft via the clutch 4 and the differential gear 3, thus driving the rear wheels 15L, 15R. When the clutch 4 becomes disengaged, the DC motor 5 is mechanically separated from the rear wheels 15L, 15R to prevent the rear wheels 15L, 15R from transmitting the driving force to a road surface. The engagement and disengagement of the clutch 4 are controlled by a four-wheel driving control unit (4WD CU) 100. The DC motor 5 is, for example, either a DC shunt motor whose forward or reverse rotation is easily selectable, or a separately excited DC motor.

While it is described above that the vehicle is of the four-wheel drive type whose front wheels 14L, 14R are driven by the engine 1 and whose rear wheels 15L, 15R are driven by the motor 5, the front wheels may be driven by the DC motor, and the rear wheels by the engine.

A storage room for the engine also contains an auxiliary alternator (ALT1) 13 and an auxiliary battery 11 to construct a normal charger/generator system. The auxiliary alternator (ALT1) 13 is belt-driven by the engine 1, and an output from the alternator is stored into the auxiliary battery 11.

Also, a driving high-power alternator (ALT2) 2 is disposed near the auxiliary alternator (ALT1) 13. The driving high-power alternator (ALT2) 2 is also belt-driven by the engine 1, and an output from the alternator 2 drives the DC motor 5. A supply voltage that the driving high-power alternator (ALT2) 2 has generated is controlled by the 4WD CU 100. A change in the supply voltage generated by the driving high-power alternator (ALT2) 2 changes a DC motor torque that is an output of the DC motor 5. That is to say, the 4WD CU 100 outputs a command value (duty signal that causes the alternator to have a required field current value) to the driving high-power alternator (ALT2) 2, thus changing the supply voltage generated thereby. The supply voltage generated by the driving high-power alternator (ALT2) 2 is applied to an armature coil 5b of the DC motor 5 and changes the output (DC motor torque) thereof. The 4WD CU 100 controls the output (DC motor torque) of the DC motor 5 by controlling the output (generated electric power) of the driving high-power alternator (ALT2) 2. Additionally, in a higher-speed region of the DC motor 5, the 4WD CU 100 directly controls the DC motor 5 to allow faster rotation thereof, by performing field-weakening control of the field current supplied to a field coil 5a of the DC motor 5.

An output from the engine (ENG) 1 is controlled by an electronically controlled throttle driven under a command from an engine control unit (ECU) 8. The electronically controlled throttle has an accelerator angle sensor (not shown), which detects an opening angle of an accelerator. If a mechanical linking type of accelerator pedal and throttle assembly is used instead of the electronically controlled throttle, the accelerator pedal can have the accelerator angle sensor. A transmission controller (TCU) 9 controls the transmission 12. An output from the accelerator angle sensor is acquired by the 4WD CU 100.

The front wheels 14L, 14R and the rear wheels 15L, 15R each have a wheel velocity sensor 16L, 16R, 17L, or 17R, respectively. Also, a brake has an anti-lock brake actuator controlled by an anti-lock brake control unit (ACU) 10.

Signals may be input from an interface of the engine control unit (ECU) 8 or of a transmission control unit (TCU) 9, or from an interface of any other control unit, via a bus of an interior LAN of the vehicle (i.e., a bus of a CAN), to the 4WD CU 100.

A large-capacity relay (RLY) 7 is provided between the driving high-power alternator (ALT2) 2 and DC the motor 5 so that the output from the driving high-power alternator (ALT2) 2 can be interrupted. Open/close operation of the relay (RLY) 7 is controlled by the 4WD CU 100. In addition, a low voltage of the auxiliary battery 11 is supplied to the clutch 4 via a 4WD relay 19, thus engaging and disengaging the clutch 4. The engagement and disengagement of the clutch 4 are also controlled by the 4WD CU 100.

Reference number 18 denotes a 4WD/2WD select switch 4WD SW, which is operated by a person who drives the vehicle. A state signal that the 4WD SW 18 generates to indicate whether a 4WD mode or a 2WD mode is selected is acquired into the 4WD CU 100.

Next, a configuration of the four-wheel driving system according to the present embodiment is described below with reference to FIG. 2.

Figure 2:
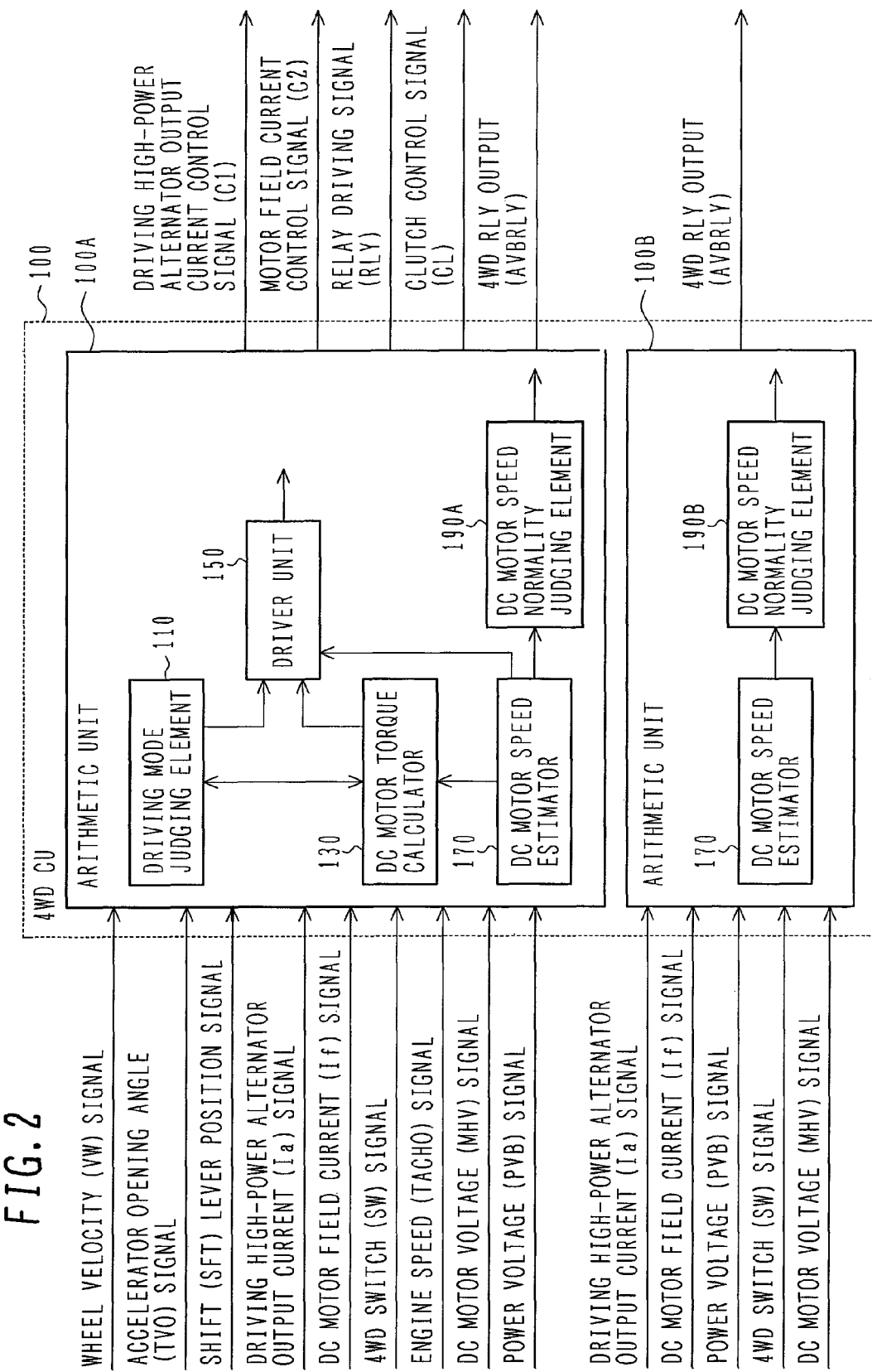
FIG. 2 is a system block diagram showing a configuration of the four-wheel driving system according to the present embodiment.

FIG. 2 is a system block diagram showing the configuration of the four-wheel driving system according to the present embodiment.

The 4WD CU 100 has a first arithmetic unit 100A and a second arithmetic unit 100B. The first arithmetic unit 100A includes a driving mode judging element 110, a DC motor torque calculator 130, a driver unit 150, a DC rotating speed estimator 170, and a first DC rotating speed normality judging element 190A. The second arithmetic unit 100B includes a similar DC rotating speed estimator 170 and a second DC rotating speed normality judging element 190B. The DC rotating speed estimator 170 is an element that outputs information on a rotating speed of the DC motor 5, and the rotating speed information output element is a substitute for a conventional speed sensor.

A wheel velocity signal (VW), an accelerator (throttle valve opening) angle signal (TVO), a shift lever position signal (SFT), a driving high-power alternator output current signal (Ia), a DC motor field current signal (If), a 4WD SW signal, an engine speed signal (TACHO), a DC motor voltage signal (MHV), and a power voltage signal (PVB) are supplied as input signals to the first arithmetic unit 100A of the 4WD CU 100.

The driving high-power alternator output current signal (Ia), the DC motor field current signal (If), the 4WD SW signal, the DC motor voltage signal (MHV), and the power voltage signal (PVB) are also supplied as input signals to the second arithmetic unit 100B of the 4WD CU 100.

The wheel velocity signal VW includes a front left-wheel velocity signal VWF_LH, front right-wheel velocity signal VWF_RH, rear left-wheel velocity signal VWR_LH, and rear right-wheel velocity signal VWR_RH detected by the wheel velocity sensors 16L, 16R, 17L, 17R, respectively. The 4WD CU 100 internally calculates a rear-wheel average velocity VWR that is an average value of the detected rear left-wheel velocity VWR_LH and rear right-wheel velocity VWR_RH.

The accelerator angle signal TVO is the output signal from the foregoing accelerator angle sensor, supplied as an input signal to the 4WD CU 100. For example, if the accelerator angle signal TVO indicates an accelerator opening level of 2%, the 4WD CU 100 generates an accelerator-on signal, and if the accelerator opening level decreases below 2%, the 4WD CU 100 generates an accelerator-off signal. It is also possible, for example, to provide hysteresis characteristics between a threshold level of 3% for accelerator-on judgment and a threshold level of 1% for accelerator-off judgment.

The shift lever position signal SFT is an input signal that the 4WD CU 100 receives as an output from a shift lever position sensor provided near a shift lever. This input signal indicates whether the shift lever is placed in a driving (D) range position or in other range positions.

The Ia signal indicates an output current of the driving high-power alternator (ALT2) 2, and this current flows through the armature coil 5b of the DC motor 5. The If signal indicates the field current flowing through the field coil 5a of the DC motor 5. The rotating speed (Nm) signal indicates the rotating speed of the motor 5. The 4WD SW signal indicates a state of the 4WD/2WD select switch. A DC rotating speed, signal Nm indicates the rotating speed of the DC motor 5. The DC motor voltage signal MHV indicates an operating voltage of the DC motor 5. The power voltage signal is supplied from the auxiliary battery 11 in order to drive the clutch 4.

The first arithmetic unit 100A of the 4WD CU 100 outputs a driving high-power alternator output current control signal CL for controlling a field current flowing through a field coil of the driving high-power alternator (ALT2) 2, a DC motor field current control signal C2 for controlling the field current flowing through the field coil of the DC motor 5, a relay driving signal RLY for controlling the opening and closing of the relay 7, a clutch control signal CL for controlling the engagement and disengagement of the clutch (CL) 4, and a 4WD RLY output signal AVBRLY for driving the 4WD relay. The second arithmetic unit 100B of the 4WD CU 100 also outputs the 4WD RLY output signal AVBRLY for driving the 4WD relay.

The driving mode judging element 110 discriminates a four-wheel driving mode on the basis of the wheel velocity signal VW, the accelerator angle signal TVO, and the shift lever position signal SFT. The driving mode discriminated is either a 4WD driving standby mode (I), a creeping mode (II), a 4WD driving control mode (III), a speed-matched driving mode (IV), or driving-mode stopping sequence mode (V).

Operation of the driving mode judging element 110 in the four-wheel driving system according to the present embodiment is described below with reference also being made to FIG. 3.

Figure 3:
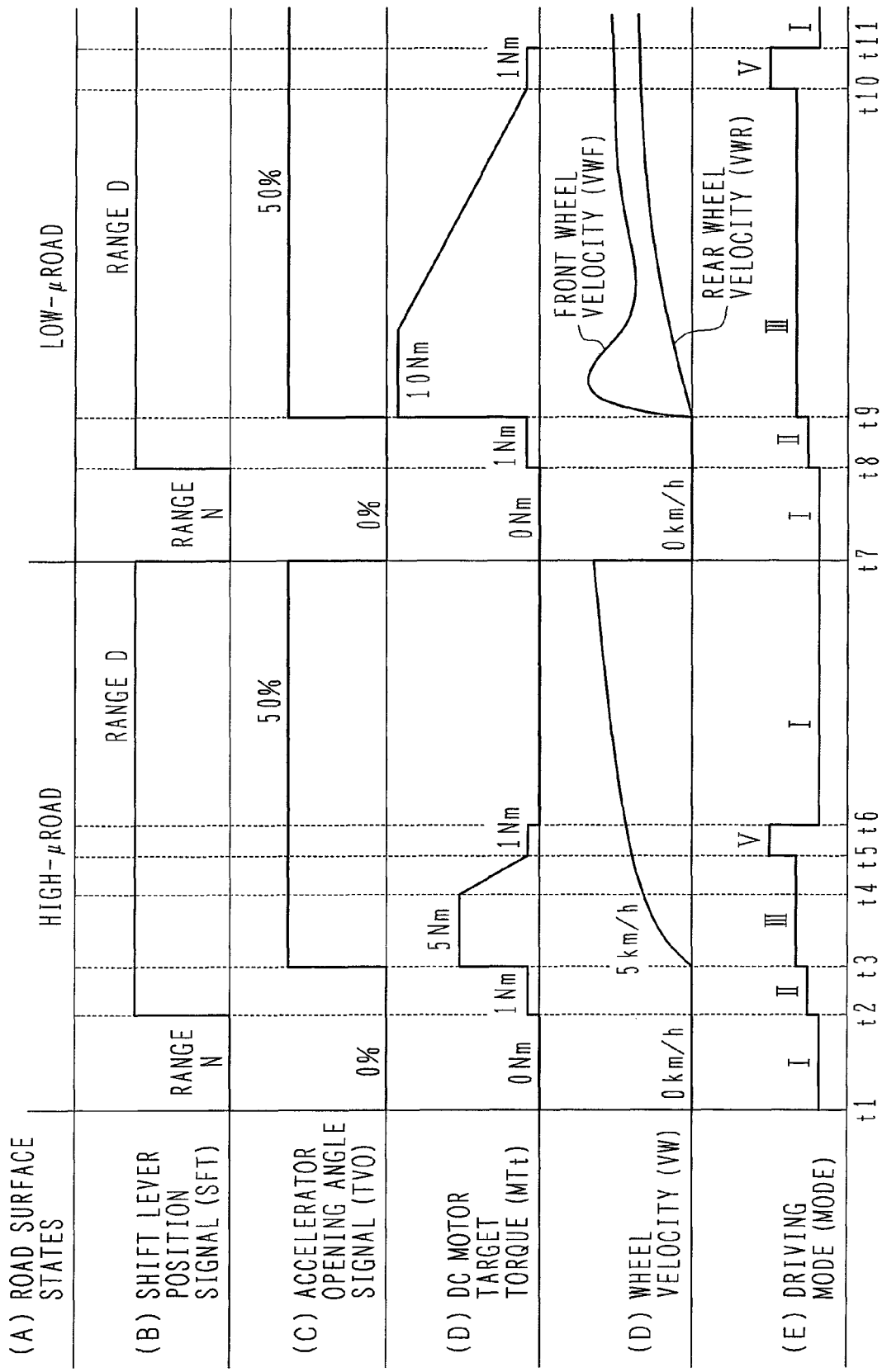
FIG. 3 is a timing chart that shows operation of a driving mode judging element in the four-wheel driving system according to the present embodiment.

FIG. 3 is a timing chart showing the operation of the driving mode judging element in the four-wheel driving system according to the present embodiment.

Section (A) in FIG. 3 indicates road surface states. For example, a high-μroad with a large road-surface frictional coefficient and a low-μroad with a small road-surface frictional coefficient are shown as the road surface states. Section (B) in FIG. 3 indicates the shift lever position. Whether the shift lever is in the D-range position or in other positions is distinguished by the output from the shift lever position sensor. Section (C) in FIG. 3 indicates the accelerator opening angle. As described above, an accelerator-on signal or an accelerator-off signal is generated, depending on a state of the accelerator angle signal TVO. For example, when the accelerator opening level reaches 2%, the accelerator-on signal is generated, and when the accelerator opening level decreases below 2%, the accelerator-off signal is generated. Section (D) in FIG. 3 indicates a DC motor-torque target value (MTt). Section (E) in FIG. 3 indicates the wheel velocity signal VW. The wheel velocity signal VW includes the front left-wheel velocity signal VWF_LH, the front right-wheel velocity VWF_RH signal, the rear left-wheel velocity VWR_LH, and the rear right-wheel velocity VWR_RH. However, the front-wheel average velocity VWF that is an average value of the detected front left-wheel velocity VWF_LH and front right-wheel velocity VWF_RH, and the rear-wheel average velocity VWR that is an average value of the detected rear left-wheel velocity VWR_LH and rear right-wheel velocity VWR_RH are shown in the figure. Section (F) indicates the driving mode that has been discriminated by the driving mode judging element 110.

When the accelerator angle sensor is off as shown in section (C) of FIG. 3, the shift lever is in neutral range position as shown in section (B) of FIG. 3, and the wheel velocity (VW) is 0 km/h as shown in section (E) of FIG. 3, the driving mode judging element 110 judges that the vehicle is in 4WD driving standby mode (I). After this, the driving mode judging element 110 outputs, for example, 0.0 Nm as a DC motor torque target value (MTt) to the driver unit 150 shown in FIG. 2. In this state, the DC motor 5 does not generate driving force.

When the accelerator angle sensor is off as shown in section (C) of FIG. 3, the shift lever is in driving position as shown in section (B) of FIG. 3, and the wheel velocity (VW) is 0 km/h as shown in section (E) of FIG. 3, the driving mode judging element 110 judges that the vehicle has entered creeping mode (II). After this, the driving mode judging element 110 outputs, for example, 1.0 Nm as a DC motor torque target (MTt) value to the driver unit 150 shown in FIG. 2. By slightly transmitting a driving torque from the DC motor 5 to the rear wheels with the output torque of the DC motor 5 remaining set to 1.0 Nm, for example, the system stands by so as to be able to respond immediately after four-wheel driving has been selected next time. The driver unit 150 outputs an ALT field current control signal so that the DC motor torque target value becomes 1.0 Nm, for example. Details of the driver unit 150 will be described later herein with reference to FIG. 7.

When the accelerator angle sensor turns on as shown in section (C) of FIG. 3 and the shift lever is put into range D as shown in section (B) of FIG. 3, the driving mode judging element 110 judges that the 4WD driving control mode (III) has been selected. After this, the driving mode judging element 110 notifies this to the DC motor torque calculator 130 shown in FIG. 2. As denoted by (D) in FIG. 3, the DC motor torque calculator 130 calculates a DC motor torque target value of 5.0 Nm, for example. This DC motor torque target value of 5.0 Nm is maintained until the wheel velocity (VW) shown in section (E) of FIG. 3 has reached 5 km/h. After this, the DC motor torque target value is linearly reduced to obtain a target torque value of 1.0 Nm. When the target torque value shown in section (D) of FIG. 3 becomes 1.0 Nm, the driving mode judging element 110 judges that the driving-mode stopping sequence mode (V) has been selected, and then maintains the DC motor torque target value of 1.0 Nm for a required time of T1. After this, the relay 7 is turned off and the clutch 4 also turned off. In addition, the DC motor torque target value is cleared to 0.0 Nm and the 4WD driving mode is set. During a start of the vehicle, therefore, not only the engine 1 drives the front wheels, but also does the DC motor 5 drive the rear wheels. Thus, starting performance of the vehicle on the low-μroad improves since all four wheels are driven during the start of the vehicle. The above sequence applies to control of driving in a dry road surface state as shown in Section (A) of FIG. 3.

On the low-μroad shown as (A) in FIG. 3, if the front wheels slip, the driving mode judging element 110 judges that there is a need to set the 4WD driving control mode (III) in order to converge the slipping state. This will be described later herein.

A composition of the DC motor torque calculator 130 in the four-wheel driving system of the present embodiment is described below with reference to FIG. 4.

Figure 4:
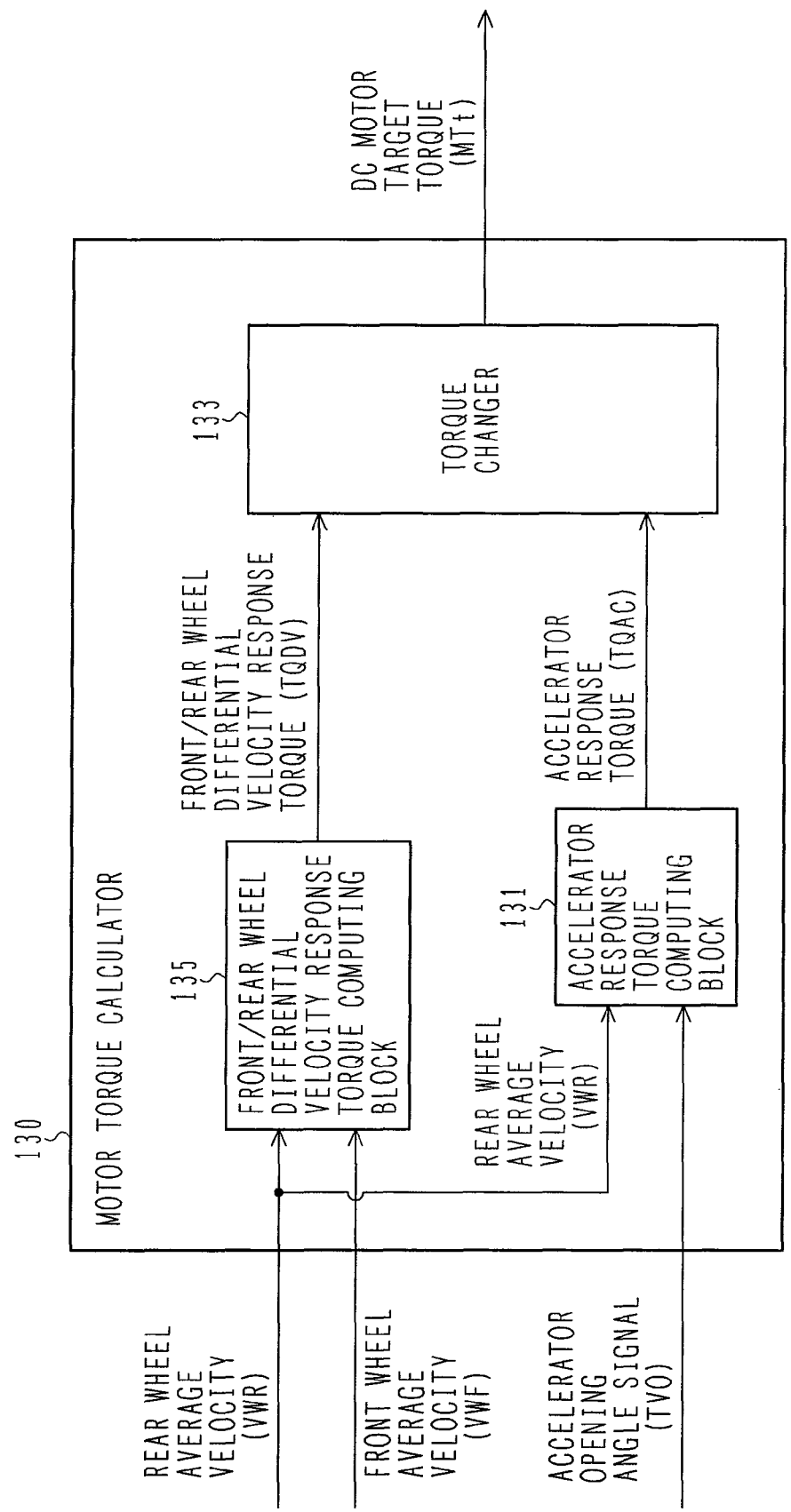
FIG. 4 is a block diagram showing a composition of a motor torque calculator in the four-wheel driving system of the present embodiment.

FIG. 4 is a block diagram showing the composition of the DC motor torque calculator in the four-wheel driving system of the present embodiment.

The DC motor torque calculator 130 includes an accelerator response torque computing block 131, a torque changer 133, and a front/rear wheel differential velocity response torque computing block 135.

The accelerator response torque computing block 131 calculates a DC motor torque target value. The front/rear wheel differential velocity response torque computing block 135 calculates a DC motor torque target value to be set when a difference arises between the front wheel velocity and the rear wheel velocity, especially, when the front wheel velocity becomes higher than the rear wheel velocity and the front wheels slip. The torque changer 133 compares the DC motor torque target value output from the accelerator response torque computing block 131, and the DC motor torque target value output from the front/rear wheel differential velocity response torque computing block 135, and outputs the greater of the two values. During vehicle traveling on a dry road, since the front/rear wheel differential velocity response torque computing block 135 outputs a DC motor torque target value of 0 Nm, the torque changer 133 outputs the same DC motor torque target value as that of the accelerator response torque computing block 131.

The DC motor torque target value that the accelerator response torque computing block 131 calculates is described below with reference to FIGS. 4 and 5.

Figure 5:
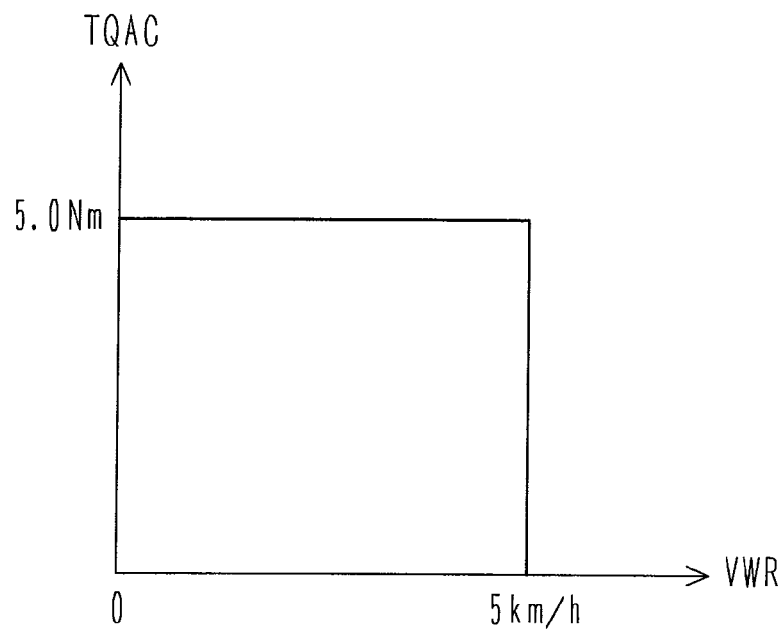
FIG. 5 is a characteristics diagram that shows operation of an accelerator response torque computing block in the motor torque calculator of the four-wheel driving system according to the present embodiment.

FIG. 5 is a characteristics diagram that shows operation of the accelerator response torque computing block in the DC motor torque calculator of the four-wheel driving system according to the present embodiment.

The rear-wheel average velocity VWR and the accelerator pedal angle TVO are input to the accelerator response torque computing block 131. The rear-wheel average velocity VWR is a value calculated as the average value of the rear left-wheel velocity VWR_LH and the rear right-wheel velocity VWR_RH.

As shown in FIG. 5, in order that at a rear-wheel average velocity VWR less than 5 km/h, accelerator response torque TQAC becomes 5.0 Nm, and that at a rear-wheel average velocity VWR of 5 km/h or more, accelerator response torque TQAC becomes 0.0 Nm, the accelerator response torque computing block 131 outputs the accelerator response torque TQAC with respect to the rear-wheel average velocity VWR when the accelerator angle signal TVO turns on.

Consequently, as illustrated in FIG. 3, the DC motor torque calculator 130 obtains a DC motor torque target value of, for example, 5.0 Nm, as denoted by (D) in FIG. 3. Next, the DC motor torque target value of 5.0 Nm is maintained until the wheel velocity VW shown as (E) in FIG. 3 has become 5 km/h. When the wheel velocity VW reaches 5 km/h, the accelerator response torque computing block 131 linearly reduces the DC motor torque target value so that the target torque will be 1.0 Nm.

Next, referring back to FIG. 3, a description is given below of driving control under the low-μroad conditions shown as (A) in FIG. 3. As shown in section (E) of FIG. 3, when a difference occurs between the front wheel average velocity VWF and the rear wheel average velocity VWR, if the front wheel average velocity VWF becomes higher than the rear wheel average velocity VWR and the front wheels slip, the driving mode judging element 110 judges that the 4WD control mode (III) has been set.

On the basis of the difference between the front wheel velocity VWF and the rear wheel velocity VWR, the front/rear wheel differential velocity response torque computing block 135 shown in FIG. 4 calculates the DC motor torque target value for converging the slipping state of the front wheels.

The DC motor torque target value that the front/rear wheel differential velocity response torque computing block 135 calculates when the driving mode judging element 110 judges that the vehicle has entered the 4WD driving control mode (III) is described below with reference to FIGS. 4 and 6.

Figure 6:
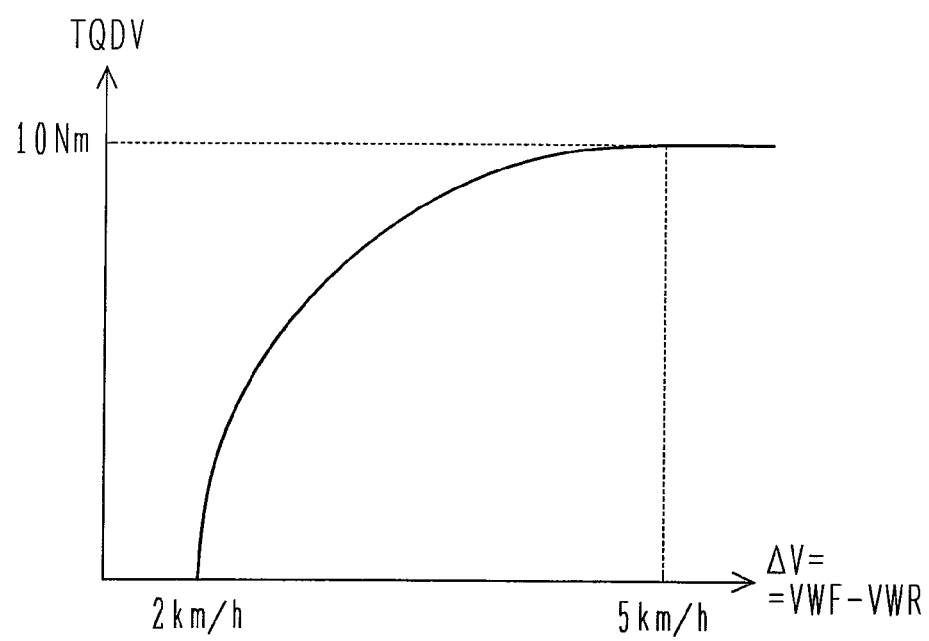
FIG. 6 is a characteristics diagram that shows operation of a front/rear wheel differential velocity response torque computing block in the motor torque calculator of the four-wheel driving system according to the present embodiment.

FIG. 6 is a characteristics diagram that shows operation of the front/rear wheel differential velocity response torque computing block in the DC motor torque calculator of the four-wheel driving system according to the present embodiment.

As shown in FIG. 4, the rear-wheel average velocity VWR and the front-wheel average velocity VWF are input to the front/rear wheel differential velocity response torque computing block 135. The front-wheel average velocity VWF is a value calculated as the average value of the front left-wheel velocity VWF_LH and the front right-wheel velocity VWF_RH.

As shown in FIG. 6, in order that for example, a front/rear wheel differential response torque TQDV will be 0 Nm for a front/rear wheel differential velocity ΔV of 2 km/h and after this, the front/rear wheel differential response torque TQDV will become 10 Nm for a front/rear wheel differential velocity ΔV of 7 km/h, the front/rear wheel differential velocity response torque computing block 135 outputs the front/rear wheel differential response torque TQDV that progressively increases. This output is based on ΔV (=VWF−VWR) that is the differential wheel velocity between the front-wheel average velocity VWF and the rear-wheel average velocity VWR. The torque changer 133 compares an output TQAC of the accelerator response torque computing block 131 and an output TQDV of the front/rear wheel differential velocity response torque computing block 135, and sets the greater of the two values as the output of the target torque calculator 130.

Consequently, as illustrated in FIG. 3, the DC motor torque calculator 130 obtains a DC motor torque target value of, for example, 10 Nm, as denoted by (C) in FIG. 3. For example, if the vehicle speed is 5 km/h or less, the output TQAC of the accelerator response torque computing block 131 is 5.0 Nm, as shown in FIG. 5. If the difference ΔV (=VWF−VWR) between the front-wheel average velocity VWF and the rear-wheel average velocity VWR is 3 km/h and the output TQDV of the front/rear wheel differential velocity response torque computing block 135 at this time is 5.5 Nm, the output of the torque changer 133 is 5.5 Nm. After the difference ΔV (=VWF−VWR) between the front-wheel average velocity VWF and the rear-wheel average velocity VWR has decreased below 2 km/h, the front/rear wheel differential velocity response torque computing block 135 linearly reduces the DC motor torque target value so that the target torque will be 1.0 Nm. When the DC motor torque target value of 1.0 Nm is reached, the driving mode changes to the stopping sequence mode (V), and after a required time, the 4WD CU 100 turns off the relay 7 and turns off the clutch 4 as well.

A composition of the driver unit 150 in the four-wheel driving system of the present embodiment is described below with reference to FIG. 7.

Figure 7:
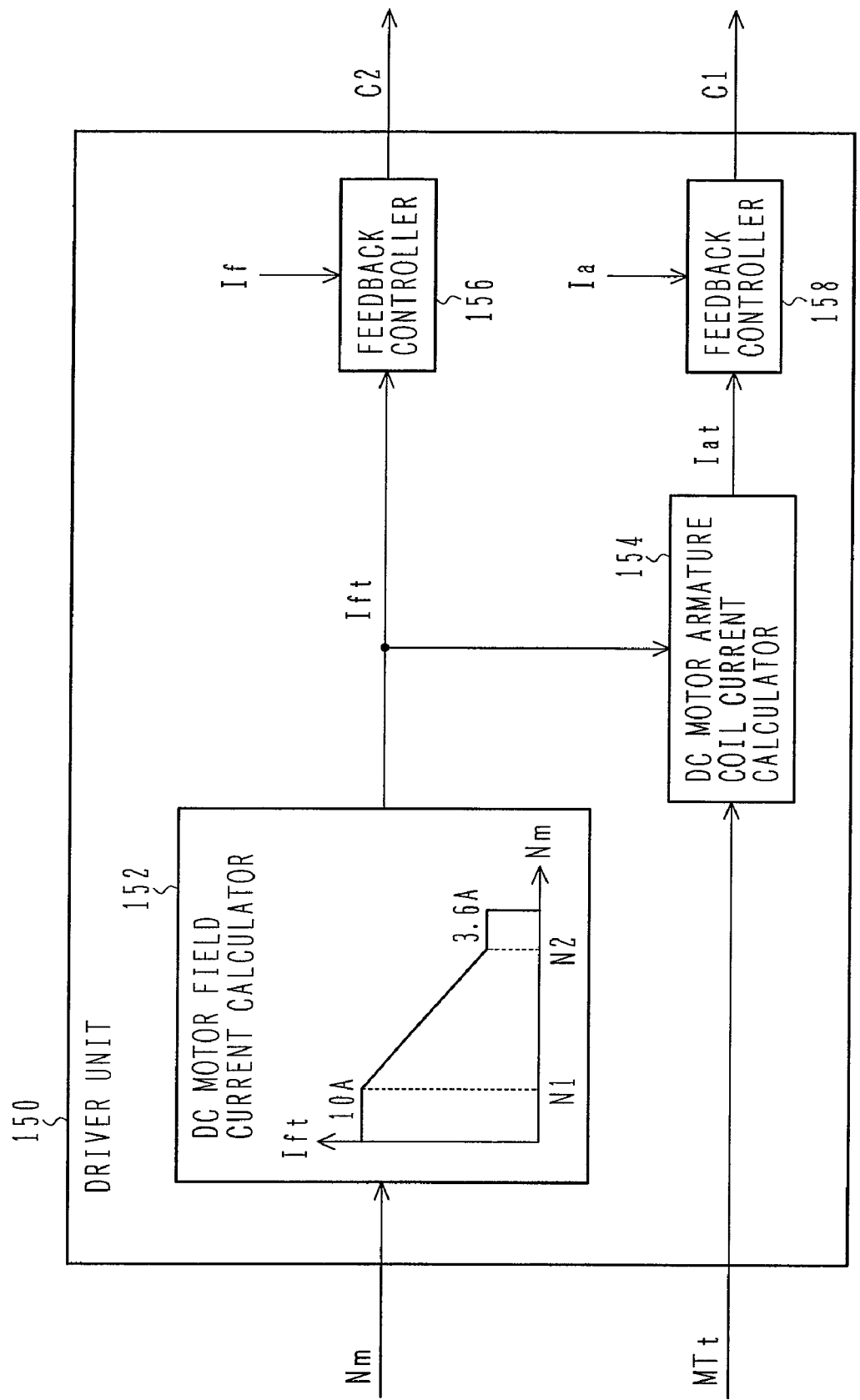
FIG. 7 is a block diagram showing a composition of a driver unit in the four-wheel driving system of the present embodiment.

FIG. 7 is a block diagram showing the composition of the driver unit 150 in the four-wheel driving system of the present embodiment.

The driver unit 150 includes a DC motor field current calculator 152, a DC motor armature coil current calculator 154, and feedback controllers 156 and 158. On the basis of the DC rotating speed signal Nm that is input to the 4WD CU 100 shown in FIG. 2, the DC motor field current calculator 152 calculates a value of the current supplied to the field coil 5a of the DC motor 5.

For example, if the DC rotating speed Nm is N1 or less, the DC motor field current calculator 152 obtains a DC motor field current target value Ift of 10 A, as shown in FIG. 7. At a DC rotating speed Nm from N1 to N2, the DC motor field current target value Ift is progressively reduced from 10 A to 3.6 A. At a DC rotating speed Nm of N2 or more, the DC motor field current target value Ift is set to be 3.6 A. In this way, when the DC motor 5 enters a high-speed region, field-weakening control is performed so that the DC motor 5 is rotatable at high speed. A difference between the DC motor field current target value Ift and an actually detected field current If of the DC motor 5 is detected by the feedback controller 156. After this, the current C2 applied to the field coil of the DC motor 5 (i.e., in the present example, a duty ratio of a duty signal for switching a power converter) is varied to perform feedback control so that the above difference is cleared to zero.

On the basis of the DC motor torque target value MTt output from the target torque calculator 130 and on the DC motor field current target value Ift output from the DC motor field current calculator 152, the DC motor armature coil current calculator 154 uses a map to calculate a value of the current supplied to the DC motor armature coil 5b. A difference between the DC motor armature coil target current value Iat and an actually detected DC motor armature coil current Ia is detected by the feedback controller 158. After this, the current C1 applied to the field coil of the driving high-power alternator (ALT2) 2 (i.e., in the present example, a duty ratio of a duty signal for switching a power converter) is varied to perform feedback control so that the above difference is cleared to zero.

Next, the DC rotating speed estimator 170 in the four-wheel driving system of the present embodiment is described below with reference to FIGS. 2, 8, and 9.

Figure 8:
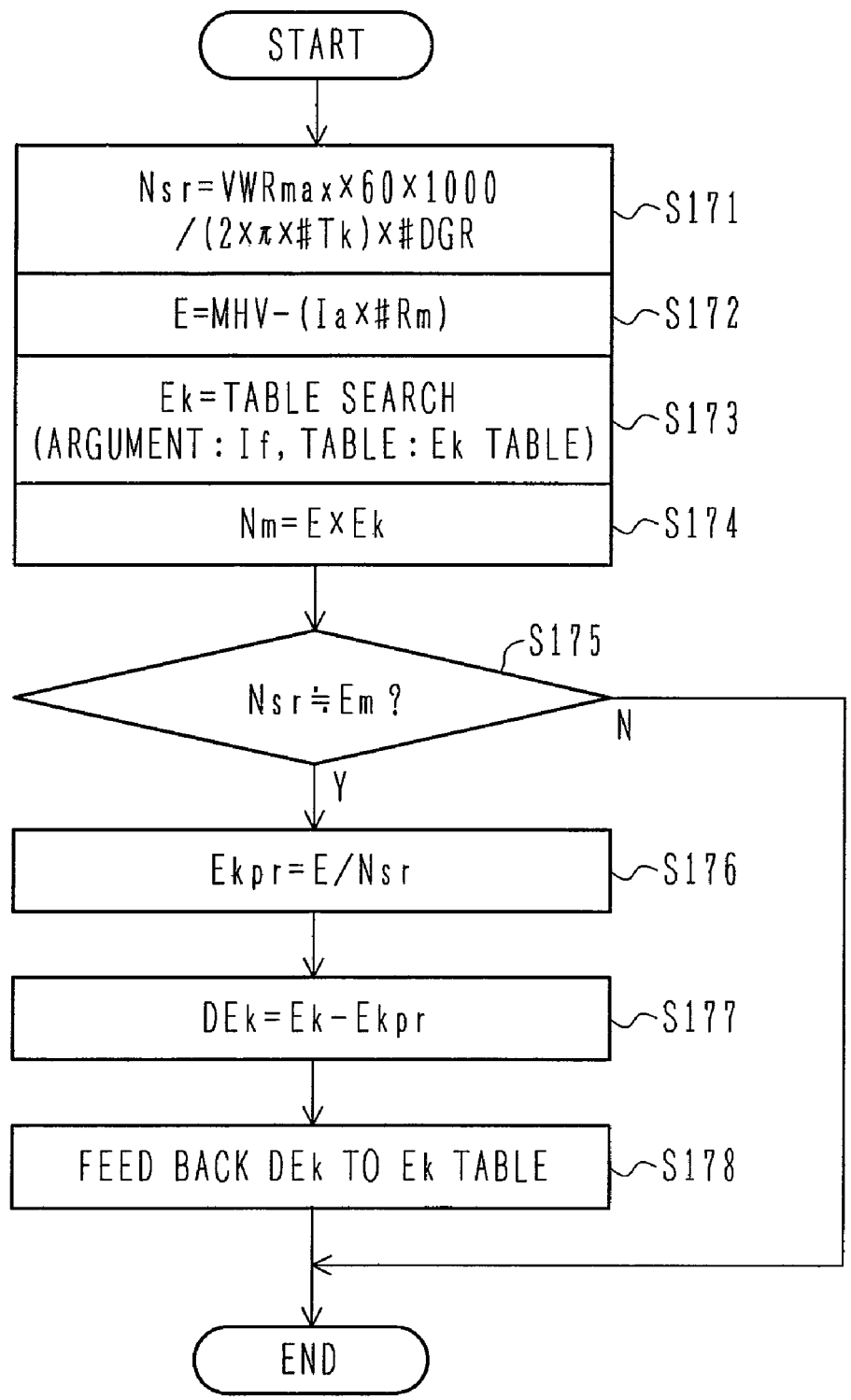
FIG. 8 is a flowchart that shows internal processing by a DC rotating speed estimator in the four-wheel driving system of the present embodiment.

FIG. 8 is a flowchart that shows internal processing by the DC rotating speed estimator in the four-wheel driving system of the present embodiment. FIG. 9 is an explanatory diagram of a DC motor induced voltage constants calculation table used by the DC rotating speed estimator in the four-wheel driving system of the present embodiment.

When the rotating velocity of a wheel is converted into a DC motor shaft speed, a maximum value of the wheel velocity becomes equal to the DC motor shaft speed through the differential gear 3. In step S171, therefore, the DC rotating speed estimator 170 first compares the rear left-wheel velocity VWR_LH and rear right-wheel velocity VWR_RH that the wheel velocity sensors 15L and 15R have respectively detected. The DC rotating speed estimator 170 defines an obtained maximum value as maximum rear-wheel velocity VWRmax, and considering tire dynamic radius #Tk and differential gear reduction ratio #DGR, calculates the DC motor shaft speed-equivalent wheel velocity Nsr as follows:

$$Nsr = VWRmax60/1000/(2\pi\#Tk) \times \#DGR$$

Next in step S172, resistance value #Rm from a DC motor voltage MHV detection position set previously for the DC rotating speed estimator 170 to remove from the DC motor voltage MHV a voltage increase due to the DC motor armature coil current Ia, to a GND position, is used for the DC rotating speed estimator 170 to calculate the DC motor induced voltage E as follows:

$$E = MHV - (Ia \times \#Rm)$$

where #Rm is the above resistance value, so a thermistor or a temperature estimator can be used to perform temperature corrections.

Next in step S173, the DC rotating speed estimator 170 calculates a first DC motor induced voltage constant Ek using the DC motor induced voltage constants calculation table of FIG. 9 from the DC motor field current If.

Next in step S174, the DC rotating speed estimator 170 uses the DC motor induced voltage E and the first DC motor induced voltage constant Ek to calculate the DC rotating speed Nm as follows:

$$Nm = E \times Ek$$

In this way, the DC rotating speed Nm can be estimated. The estimated DC rotating speed value Nm is supplied to the DC motor torque calculator 130 and the driver unit 150.

As described above, in the present embodiment, calculation of the DC motor induced voltage E from the DC motor voltage MHV and the DC motor armature coil current Ia is performed without using a speed sensor, and the rotating speed Nm is estimated using the calculated DC motor induced voltage E. Accordingly, detection accuracy in very low speed ranges is improved, erroneous detection or reduction in accuracy, caused by motor noise, load noise, or a backlash of the reduction gear, can be prevented, and controllability of the electric motor during control improves.

Next in step S175 of FIG. 8, the DC rotating speed estimator 170 compares the DC motor shaft speed-equivalent wheel velocity Nsr and the DC rotating speed Nm, and if a difference between both stays within a required range, the DC rotating speed estimator 170 judges that the DC motor shaft speed-equivalent wheel velocity Nsr and the DC rotating speed Nm are in agreement.

Additionally, in step S175, if synchronization (the above agreement) is discriminated, the clutch can be regarded as engaged, a backlash or the clutch and a backlash of the gear can be regarded as absorbed, and the DC motor shaft speed-equivalent wheel velocity Nsr can be regarded as equal to the DC rotating speed Nm. In step S176, therefore, the DC rotating speed estimator 170 uses the DC motor induced voltage E and the DC motor shaft speed-equivalent wheel velocity Nsr and the DC rotating speed Nm to calculate the DC motor induced voltage constant-2EKpr as follows:

$$Ekpr = E/Nsr$$

Next in step S177, the DC rotating speed estimator 170 compares the DC motor induced voltage constant 1Ek and the DC motor induced voltage constant 2Ekpr, and if there is a difference, defines the difference as a DC motor induced voltage constant-correcting value DEk.

Next in step S178, the DC rotating speed estimator 170 feeds back the DC motor induced voltage constant-correcting value DEk into the DC motor induced voltage constants calculation table shown in FIG. 9. In the feedback step, when a storage medium such as an EPROM is used to store the DC motor induced voltage constant-correcting value DEk and view the DC motor induced voltage constants calculation table of FIG. 9, the DC motor induced voltage constant-correcting value DEk is read out from the above medium and corrected. The DC motor induced voltage constants calculation table of FIG. 9 can also be stored into the storage medium such as an EPROM, and directly corrected. The DC motor induced voltage constant-correcting value DEk may be fed back after being averaged for each grid of the DC motor induced voltage constants calculation table of FIG. 9 or for each range separated midway between grids.

The DC rotating speed estimator 170 judges the motor to have deteriorated, if the DC motor induced voltage constant-correcting value DEk, the DC motor induced voltage constant 2Ekpr, or the DC motor induced voltage constant Ek oversteps a previously set first range. After motor deterioration has been judged to be occurring, feedback of the DC motor induced voltage constant-correcting value DEk is prohibited.

The DC rotating speed estimator 170 judges the system to be abnormal, if the DC motor induced voltage constant-correcting value DEk, the DC motor induced voltage constant 2Ekpr, or the DC motor induced voltage constant Ek oversteps a second range previously set to be further outside the first range. After the system has been judged to be abnormal, feedback of the DC motor induced voltage constant-correcting value DEk is also prohibited.

As shown in FIG. 2, an output of the DC rotating speed estimator 170 is input to the first DC rotating speed normality judging element 190A in the first arithmetic unit 10A. If the rotating speed Nm estimated by the DC rotating speed estimator 170 is greater than a required value Nm1, the first DC rotating speed normality judging element 190A judges the estimated speed Nm to be abnormal. Consequently, the first DC rotating speed normality judging element 190A controls to open the 4WD relay 19 to prevent the voltage of the auxiliary battery 11 from being supplied to the clutch 4. Thus, the clutch 4 is disengaged, which in turn, when the estimated rotating speed Nm is abnormal, separates the motor from the wheels. This establishes a fail-safe state.

As shown in FIG. 2, the second arithmetic unit 100B also has an DC rotating speed estimator 170, an output thereof is input to the second DC rotating speed normality judging element 190B. If the rotating speed Nm estimated by the DC rotating speed estimator 170 is greater than a required second value Nm2 (Nm2>Nm1), the DC rotating speed normality judging element 190B judges the estimated speed Nm to be abnormal. Consequently, the DC rotating speed normality judging element 190B controls to open the 4WD relay 19 to prevent the voltage of the auxiliary battery 11 from being supplied to the clutch 4. Thus, the clutch 4 is disengaged, which in turn, when the estimated rotating speed Nm is abnormal, separates the motor from the wheels. This establishes a fail-safe state. For these reasons, even if the first arithmetic unit 100A becomes uncontrollable or encounters other trouble to make motor overspeed likely to occur, safety can be improved by disengaging the clutch 4.

The second arithmetic unit 100B here is provided to ensure fail-safe operation for speed estimation. The second arithmetic unit 100B receives five input signals. These are the driving high-power alternator output signal (Ia), the DC motor field current (If) signal, the 4WD SW signal, the DC motor voltage (MHV) signal, and the power voltage (PVB) signal. These signals are also input to the first arithmetic unit 100A, thus constituting a duplex system.

Of the five signals, the DC motor voltage (MHV) signal and the driving high-power alternator output signal (Ia) are used for the DC rotating speed estimator 170 of the second arithmetic unit 100B of FIG. 2 to estimate the DC rotating speed. The two signals and the signals used to estimate the DC rotating speed in the DC rotating speed estimator 170 of the first arithmetic unit 100B take the duplex arrangement, and are used to improve safety as the duplex system to estimate the DC rotating speed. The driving high-power alternator output signal (Ia) is used for more accurate estimation of the DC rotating speed, so in terms of duplex composition, only the DC motor voltage (MHV) signal may be used to constitute the duplex system.

Since the DC motor field current (If) signal allows motor field current state discrimination, if the field current of the motor is unusually large, the DC rotating speed normality judging element 190B in the second arithmetic unit 100B functions as a fail-safe element to disengage the clutch 4 by opening the 4WD relay 19 and preventing the voltage of the auxiliary battery 11 from being supplied to the clutch 4.

The power voltage (PVB) source is a battery and supplies driving power to the relay, the clutch, and more. Since the power voltage (PVB) signal can be used for status monitoring of the 4WD relay 19, if the power voltage becomes abnormal, the DC rotating speed normality judging element 190B in the second arithmetic unit 100B functions as a fail-safe element to disengage the clutch 4 by opening the 4WD relay 19 and preventing the voltage of the auxiliary battery 11 from being supplied to the clutch 4.

The 4WD SW signal can also be used to monitor the state of the 4WD relay 19. If a voltage abnormality occurs, the DC rotating speed normality judging element 190B in the second arithmetic unit 100B functions as a fail-safe element to disengage the clutch 4 by opening the 4WD relay 19 and preventing the voltage of the auxiliary battery 11 from being supplied to the clutch 4.

As described above, according to the present embodiment, the rotating speed of the DC electric motor can be detected accurately, even during motor rotation at very low speeds, without being influenced by motor noise, load noise, or a backlash of the reduction gear. This makes it possible to improve traveling stability and roadability. In addition, motor deterioration and erroneous detection become easy and safety can be improved.

What is claimed is:

1. A vehicle driving system comprising:
    an electric motor driven by an electric power supply mounted in a vehicle, the electric motor being adapted so as to use a reduction gear to supply driving force to wheels different from wheels driven by an engine;
    control means for controlling the driving of the electric motor by controlling electric power supplied from the power supply mounted in the vehicle to the electric motor; and
    means for outputting information on a rotating speed of the electric motor; wherein,
    the rotating speed information output means is also rotating speed estimation means that estimates the rotating speed of the electric motor from an induced voltage thereof;
    in accordance with input information including the rotating speed of the electric motor estimated by the rotating speed estimation means, the control means controls the electric power to be supplied from the vehicle-mounted power supply to the electric motor;
    the electric motor includes a field coil; and
    the rotating speed estimation means estimates a first motor-induced voltage constant Ek from a field current flowing through the field coil, the rotating speed estimation means estimating the rotating speed of the electric motor by using the estimated first motor-induced voltage constant Ek.

2. The vehicle driving system according to claim 1, wherein:
    driving force that has been output from the electric motor is transmitted to the wheels via a clutch, and;
    if an output shaft speed of the clutch and the rotating speed of the electric motor match, the rotating speed estimation means estimates a second motor-induced voltage constant Ekpr from the output shaft speed of the clutch and the first motor-induced voltage constant Ek, and feeds back a difference between the first motor-induced voltage constant Ek and the second motor-induced voltage constant Ekpr into the first motor-induced voltage constant Ek.

3. The vehicle driving system according to claim 2, wherein:
    when the rotating speed estimation means feeds back a comparison result on the first motor-induced voltage constant Ek and the second motor-induced voltage constant Ekpr into the first motor-induced voltage constant Ek, if a value of the second motor-induced voltage constant Ekpr is outside a previously set range, the rotating speed estimation means prohibits the feedback and judges that the system is abnormal.

4. The vehicle driving system according to claim 2, wherein:
    if a value of the first fed back motor-induced voltage constant Ek oversteps a previously set range, the rotating speed estimation means judges that the system is abnormal.

5. The vehicle driving system according to claim 2, wherein:
    if the value of the first fed back motor-induced voltage constant Ek oversteps the previously set range, the rotating speed estimation means judges that the electric motor is in a deterioration state.

6. The vehicle driving system according to claim 2, wherein:
    the system comprises a plurality of rotating speed estimation means each of which estimates the rotating speed of the electric motor.

7. The vehicle driving system according to claim 6, wherein:
    if the rotating speed of the electric motor that has been estimated by a first rotating speed estimation means which is one of the plural rotating speed estimation means exceeds a first required value, the driving of the wheels by the electric motor is stopped; and if the rotating speed of the electric motor that has been estimated by a second rotating speed estimation means which is one of the remaining plural rotating speed estimation means exceeds a second required value greater than the first required value, the driving of the wheels by the electric motor is stopped.

8. The vehicle driving system according to claim 7, wherein:

of all information on a field current of the electric motor, on a state of a selector for selecting wheel driving with the motor alone or wheel driving with both the motor and the electric motor, and on a power voltage, at least one kind of information is concurrently input to the first and second rotating speed estimation means.

9. A vehicle driving system comprising:

an electric motor using a reduction gear to supply driving force to wheels different from wheels driven by an engine;

an alternator driven by the engine in order to generate electric power necessary to drive the electric motor;

control means for controlling the driving of the electric motor by controlling the electric power to be supplied from the alternator to the electric motor; and means for outputting information on a rotating speed of the electric motor; wherein, the rotating speed information output means is also rotating speed estimation means that estimates the rotating speed of the electric motor from an induced voltage thereof;

in accordance with input information including the rotating speed of the electric motor estimated by the rotating speed estimation means, the control means controls the electric power to be supplied from the alternator to the electric motor;

the electric motor includes a field coil; and the rotating speed estimation means estimates a first motor-induced voltage constant Ek from a field current flowing through the field coil, the rotating speed estimation means estimating the rotating speed of the electric motor by using the estimated first motor-induced voltage constant Ek.

* * * * *